US012210228B2

(12) United States Patent
Guillot et al.

(10) Patent No.: US 12,210,228 B2
(45) Date of Patent: Jan. 28, 2025

(54) LENS ELEMENT

(71) Applicant: Essilor International, Charenton-le-Pont (FR)

(72) Inventors: Matthieu Guillot, Charenton-le-Pont (FR); Bruno Fermigier, Charenton-le-Pont (FR); Marius Peloux, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 1123 days.

(21) Appl. No.: 17/050,322

(22) PCT Filed: Apr. 1, 2019

(86) PCT No.: PCT/EP2019/058152
§ 371 (c)(1),
(2) Date: Oct. 23, 2020

(87) PCT Pub. No.: WO2019/206569
PCT Pub. Date: Oct. 31, 2019

(65) Prior Publication Data
US 2021/0080750 A1     Mar. 18, 2021

(30) Foreign Application Priority Data

Apr. 26, 2018   (EP) .................................. 18305527
Mar. 1, 2019    (WO) ................. PCT/EP2019/055222

(51) Int. Cl.
*G02C 7/06*     (2006.01)
*G02C 7/02*     (2006.01)
*G02C 7/08*     (2006.01)

(52) U.S. Cl.
CPC ............... *G02C 7/06* (2013.01); *G02C 7/022* (2013.01); *G02C 7/086* (2013.01); *G02C 2202/20* (2013.01); *G02C 2202/24* (2013.01)

(58) Field of Classification Search
CPC ........ G02C 7/022; G02C 7/024; G02C 7/025; G02C 7/027; G02C 7/028; G02C 7/06;
(Continued)

(56) References Cited

U.S. PATENT DOCUMENTS 4,909,818 A  *  3/1990  Jones .................... G02C 7/042
                                                         216/26
5,142,411 A      8/1992  Fiala
(Continued)

FOREIGN PATENT DOCUMENTS

CN      107212949 A      8/2017
EP    3 112 925 A1       1/2017
(Continued)

OTHER PUBLICATIONS

Russian Office Action issued Sep. 19, 2022 in Russian Patent Application No. 2020138610 (with English translation), documents 1 through 5 and 15 through 17 therein, 17 pages.
(Continued)

*Primary Examiner* — Ephrem Z Mebrahtu
(74) *Attorney, Agent, or Firm* — Oblon, McClelland, Maier & Neustadt, L.L.P.

(57) ABSTRACT

A lens element intended to be worn in front of an eye of a wearer comprising: —a prescription portion configured to provide to the wearer in standard wearing conditions a first optical function based on the prescription of the wearer for correcting an abnormal refraction of said eye of the wearer, and—a plurality of contiguous optical elements, wherein each optical element has a simultaneously bifocal optical function that provides simultaneously: —a second optical function in standard wearing conditions and—a third optical function of not focusing an image on the retina of the eye in said standard wearing conditions so as to slow down the progression of the abnormal refraction of the eye.

14 Claims, 5 Drawing Sheets

(58) Field of Classification Search
CPC ........ G02C 7/061; G02C 7/063; G02C 7/065; G02C 7/066; G02C 7/068
See application file for complete search history.

(56) References Cited

U.S. PATENT DOCUMENTS

| | | | |
|---|---|---|---|
| 5,805,260 | A | 9/1998 | Roffman et al. |
| 6,086,203 | A | 6/2000 | Blum et al. |
| 10,564,448 | B2 | 2/2020 | Ando |
| 10,845,619 | B2 | 11/2020 | Mappes et al. |
| 2006/0082729 | A1 | 4/2006 | To et al. |
| 2008/0218687 | A1 | 9/2008 | Phillips |
| 2008/0239236 | A1 | 10/2008 | Blum et al. |
| 2009/0268154 | A1* | 10/2009 | Meyers ............... G02C 7/12 528/370 |
| 2012/0062836 | A1* | 3/2012 | Tse ................. G02C 7/042 351/159.41 |
| 2012/0176582 | A1* | 7/2012 | Back ............... G02C 7/041 351/159.73 |
| 2014/0277433 | A1 | 9/2014 | Pugh et al. |
| 2014/0347622 | A1 | 11/2014 | Wu |
| 2015/0109574 | A1 | 4/2015 | Tse et al. |
| 2015/0124212 | A1 | 5/2015 | Loertscher et al. |
| 2015/0241717 | A1* | 8/2015 | Bonnin ............... G02C 7/16 351/159.6 |
| 2016/0161766 | A1 | 6/2016 | Archambeau et al. |
| 2016/0306192 | A1 | 10/2016 | Marshall et al. |
| 2016/0377884 | A1 | 12/2016 | Lau et al. |
| 2017/0131567 | A1* | 5/2017 | To ..................... G02C 7/06 |
| 2017/0184875 | A1 | 6/2017 | Newman |
| 2018/0275428 | A1* | 9/2018 | Ando ............... G02C 7/044 |
| 2019/0004334 | A1* | 1/2019 | Liao ............... G02B 9/34 |
| 2019/0154877 | A1* | 5/2019 | Capasso ............ G02B 1/002 |

FOREIGN PATENT DOCUMENTS

| | | |
|---|---|---|
| EP | 3 273 292 A1 | 1/2018 |
| EP | 3 461 460 A1 | 4/2019 |
| JP | 63-254415 A | 10/1988 |
| JP | 09-26558 | 1/1997 |
| JP | 2008-250316 A | 10/2008 |
| JP | 2010-42424 A | 2/2010 |
| JP | 2016-275134 A | 12/2010 |
| JP | 2013-537317 A | 9/2013 |
| JP | 2016-525722 A | 8/2016 |
| KR | 10-2007-0056065 A | 5/2007 |
| WO | WO 2015/147758 A1 | 10/2015 |
| WO | WO 2016/168746 A1 | 10/2016 |
| WO | WO 2017/056305 A1 | 4/2017 |
| WO | WO 2018/026697 A1 | 2/2018 |

OTHER PUBLICATIONS

International Search Report issued Jun. 26, 2019 in PCT/EP2019/058152 filed Apr. 1, 2019.
European Office Action issued on Mar. 21, 2023 in European Patent Application No. 19 715 077.4, reference 15 therein, 4 pages.
Japanese Office Action issued on Jan. 10, 2023 in Japanese Patent Application No. 2020-560128 (with English translation), documents 15-20 therein, 14 pages.
Office Action dated Jun. 26, 2024, issued in counterpart KR Application No. 10-2020-7030815 filed on Mar. 1, 2019, with English Translation, citing documents No. 15 and 16. (17 pages).

* cited by examiner

LENS ELEMENT

TECHNICAL FIELD

The invention relates to a lens element intended to be worn in front of an eye of a person to suppress progression of abnormal refractions of the eye such as myopia or hyperopia.

BACKGROUND OF THE INVENTION

Myopia of an eye is characterized by the fact that the eye focuses distant objects in front of its retina. Myopia is usually corrected using a concave lens and hypermetropia is usually corrected using a convex lens.

It has been observed that some individuals when corrected using conventional single vision optical lenses, in particular children, focus inaccurately when they observe an object which is situated at a short distance away, that is to say, in near vision conditions. Because of this focusing defect on the part of a myopic child which is corrected for his far vision, the image of an object close by is also formed behind his retina, even in the foveal area.

Such focusing defect may have an impact on the progression of myopia of such individuals. One may observe that for most of said individual the myopia defect tends to increase over time.

Therefore, it appears that there is a need for a lens element that would suppress or at least slow down progression of abnormal refractions of the eye such as myopia or hyperopia.

SUMMARY OF THE INVENTION

To this end, the invention proposes a lens element intended to be worn in front of an eye of a wearer comprising:
 a prescription portion configured to provide to the wearer in standard wearing conditions a first optical power based on the prescription of the wearer for correcting an abnormal refraction of said eye of the wearer, and
 a plurality of contiguous optical elements,
wherein each optical element has a simultaneously bifocal optical function that provides simultaneously:
 a second optical function in standard wearing conditions and
 a third optical function of not focusing an image on the retina of the eye in said standard wearing conditions so as to slow down the progression of the abnormal refraction of the eye.

Advantageously, having a plurality of contiguous optical elements that provide simultaneously a second and third optical function, allows having an easy to configure lens elements that reduce the progression of abnormal refractions of the eye such as myopia or hyperopia by having part of the light focus on the retina of the wearer and part of the light focus either in front or behind the retina of the wearer.

Potentially the lens element according to the invention may further allow selecting the part of the light that is to be focused on the retina and the part of the light that is not to be focus on the retina of the eye.

According to further embodiments which can be considered alone or in combination:
 the optical power of the second optical function in standard wearing conditions is smaller than or equal to 0.25 diopters; and/or
 each optical element has an optical axis; and/or
 the lens element is an edged lens element intended to be mounted in a spectacle frame and the whole surface of at least one face of the lens element is covered with the plurality of contiguous optical elements; and/or
 at least part of the prescription portion does not comprise optical elements, for example the zone of the prescription portion around the optical center of the lens element; and/or
 the prescription portion is formed as the portion other than the portions formed as the plurality of optical elements; and/or
 at least part of, for example all of, the optical elements are arranged according to a predefined array, for example a square or a hexagonal array on at least one of the surfaces of the lens element; and/or
 at least part of, for example all of, the optical elements are arranged along a plurality of concentric rings; and/or
 at least part, for example all, of the optical elements are located on the front surface of the lens element; and/or
 at least part, for example all, of the optical elements are located on the back surface of the lens element; and/or
 at least part, for example all, of the optical elements are located between the front and the back surface of the lens element; and/or
 at least part, for example all, of the optical elements are made of a birefringent material; and/or
 at least part, for example all, of the optical elements are diffractive lenses; and/or
 at least part, for example all, of the optical elements are n-Fresnel lenses; and/or
 at least part, for example all, of the diffractive lenses comprises a metasurface structure; and/or
 at least part, for example all, of optical elements are multifocal binary components; and/or
 at least part, for example all, of the optical elements are pixelated lenses, and/or
 the difference between the optical power of the second optical function and the optical power of the third optical function is greater than or equal to 0.5 D; and/or
 the difference between the optical power of the first optical function and the optical power of the third optical function is greater than or equal to 0.5 D; and/or
 at least one, for example all, of the optical elements has a shape configured so as to create a caustic in front of the retina of the eye of the person; and/or
 at least part, for example all, of the optical element have an optical function that comprises high order optical aberrations; and/or
 the lens element comprises an ophthalmic lens bearing the prescription portion and a clip-on bearing the plurality of contiguous optical elements adapted to be removably attached to the ophthalmic lens when the lens element is worn.

The invention also relates to a method for providing a lens element intended to be worn in front of an eye of a wearer according to the invention, wherein the method comprises the steps of:
 providing a lens member configured to provide to the wearer in standard wearing conditions a first refractive power based on the prescription for the wearer for correcting an abnormal refraction of said eye of the wearer,
 providing an optical patch comprising a plurality of contiguous optical elements,
 forming a lens element by placing the optical patch on one of the front or back surface of the lens member, wherein each optical element has a simultaneously bifocal optical function that provides simultaneously when said patch is placed on one of the surfaces of the lens member, and for example an optical axis:

a second optical function in standard wearing conditions and a third optical function of not focusing an image on the retina of the eye in said standard wearing conditions so as to slow down the progression of the abnormal refraction of the eye.

The invention further relates to a method for providing a lens element intended to be worn in front of an eye of a wearer according to the invention, wherein the method comprises the step of casting the lens element and during the casting step providing an optical patch comprising a plurality of contiguous optical elements each optical element having a simultaneously bifocal optical function that provides simultaneously when said lens element is worn before said eye of the wearer, and for example an optical axis:

a second optical function in standard wearing conditions and a third optical function of not focusing an image on the retina of the eye in said standard wearing conditions so as to slow down the progression of the abnormal refraction of the eye.

BRIEF DESCRIPTION OF THE DRAWINGS

Non-limiting embodiments of the invention will now be described with reference to the accompanying drawing wherein.

Elements in the figures are illustrated for simplicity and clarity and have not necessarily been drawn to scale. For example, the dimensions of some of the elements in the figure may be exaggerated relative to other elements to help to improve the understanding of the embodiments of the present invention.

DETAILED DESCRIPTION OF EMBODIMENTS OF THE INVENTION

The invention relates to a lens element, in particular to a lens element intended to be worn in front of an eye of a person.

In the reminder of the description, terms like «up», «bottom», «horizontal», «vertical», «above», «below», «front», «rear» or other words indicating relative position may be used. These terms are to be understood in the wearing conditions of the lens element.

In the context of the present invention, the term "lens element" can refer to contact lens, an uncut optical lens or a spectacle optical lens edged to fit a specific spectacle frame or an ophthalmic lens and an optical device adapted to be positioned on the ophthalmic lens. The optical device may be positioned on the front or back surface of the ophthalmic lens. The optical device may be an optical patch. The optical device may be adapted to be removably positioned on the ophthalmic lens for example a clip configured to be clipped on a spectacle frame comprising the ophthalmic lens.

A lens element 10 according to the invention is adapted for a person and intended to be worn in front of an eye of said person.

Figure 1B:
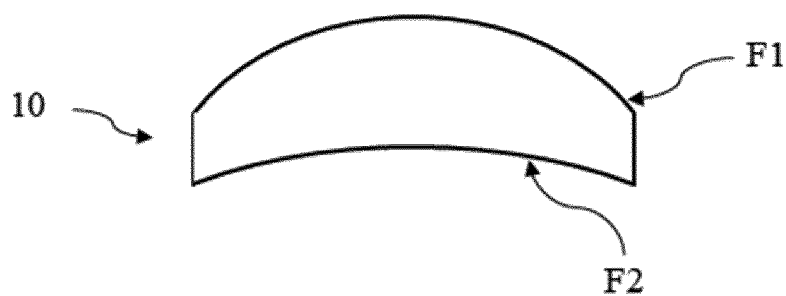
FIG. 1b is a general profile view of a lens element according to the invention.
Figure 1A:
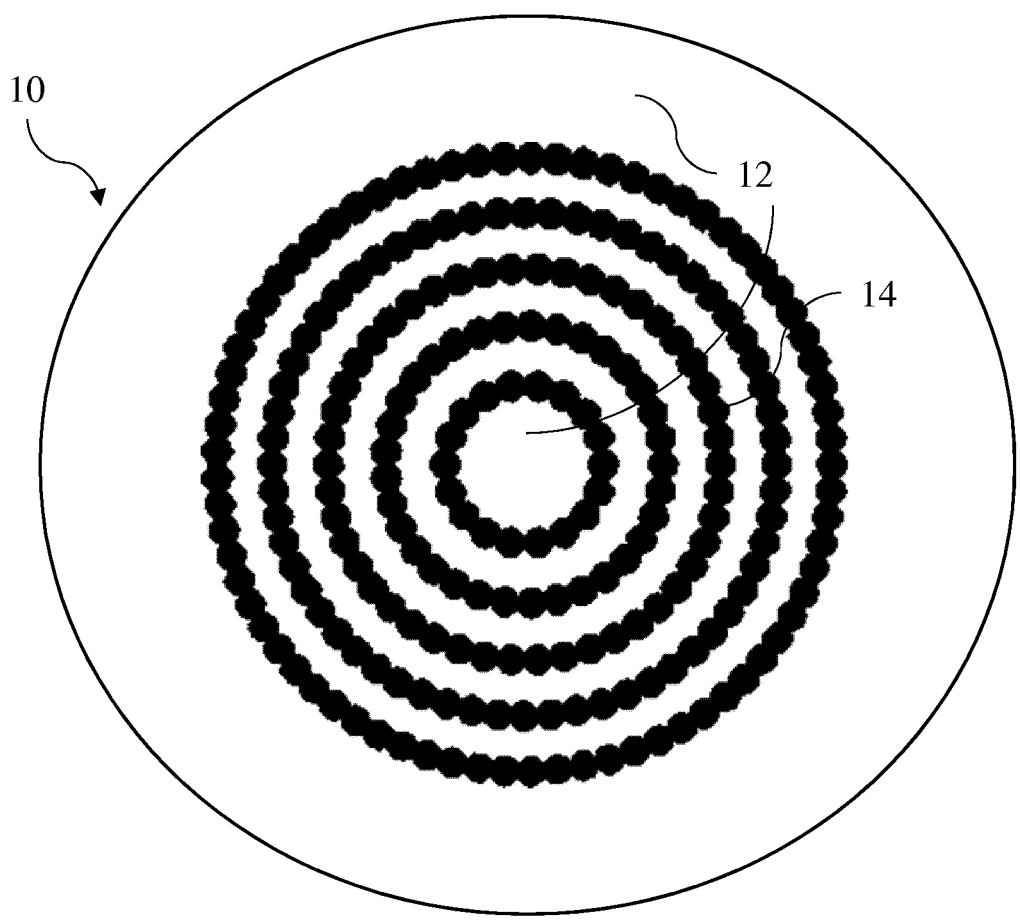
FIG. 1a is a plan view of a lens element according to the invention.

As represented on FIG. 1a, a lens element 10 according to the invention comprises:

a prescription portion 12, and a plurality of contiguous optical elements 14.

The prescription portion 12 is configured to provide to the wearer in standard wearing conditions a first optical function based on the prescription of the eye of the wearer for correcting an abnormal refraction of said eye of the wearer.

The wearing conditions are to be understood as the position of the lens element with relation to the eye of a wearer, for example defined by a pantoscopic angle, a Cornea to lens distance, a Pupil-cornea distance, a centre of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens; for example equal to 12 mm.

The Pupil-cornea distance is the distance along the visual axis of the eye between its pupil and cornea; usually equal to 2 mm.

The CRE to pupil distance is the distance along the visual axis of the eye between its center of rotation (CRE) and cornea; for example equal to 11.5 mm.

The CRE to lens distance is the distance along the visual axis of the eye in the primary position (usually taken to be the horizontal) between the CRE of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to −8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of standard wearer condition may be defined by a pantoscopic angle of −8°, a Cornea to lens distance of 12 mm, a Pupil-cornea distance of 2 mm, a CRE to pupil distance of 11.5 mm, a CRE to lens distance of 25.5 mm and a wrap angle of 0°.

The term "prescription" is to be understood to mean a set of optical characteristics of optical power, of astigmatism, of prismatic deviation, determined by an ophthalmologist or optometrist in order to correct the vision defects of the wearer, for example by means of a lens positioned in front of his eye. For example, the prescription for a myopic eye comprises the values of optical power and of astigmatism with an axis for the distance vision.

Each optical element 14 of the plurality of contiguous optical elements has a simultaneously bifocal optical function and for example an optical axis.

The optical functions of each optical element 14 may be different one from the others.

The simultaneously bifocal optical function provides simultaneously:
- a second optical function in standard wearing conditions, and
- a third optical function of not focusing an image on the retina of the eye in said standard wearing conditions so as to slow down the progression of the abnormal refraction of the eye.

The second and third optical functions differ at least in that their optical powers they provide are different one from the other. In the sense of the invention two optical powers are different if the absolute value of the difference between these two powers is greater than or equal to 0.1 D.

In the context of the present invention, two optical elements are to be considered contiguous if there is a path linking the two optical elements all along which one may measure in standard wearing conditions at least one optical power different from the optical power based on the prescription of the wearer for correcting an abnormal refraction of the eye of the wearer.

Each optical element of the plurality of contiguous optical elements is transparent on the whole visible spectrum.

As illustrated on FIG. 1b, a lens element 10 according to the invention comprises an object side surface F1, for example formed as a convex curved surface toward an object side, and an eye side surface F2, for example formed as a concave surface having a different curvature than the curvature of the object side surface F1.

According to an embodiment of the invention, at least part, for example all, of the contiguous optical elements are located on the front surface of the lens element.

At least part, for example all, of the contiguous optical elements may be located on the back surface of the ophthalmic lens.

At least part, for example all, of the contiguous optical elements may be located between the front and back surfaces of the lens element. For example, the lens element may comprise zones of different refractive index forming the contiguous optical elements.

According to an embodiment of the invention, the lens element may comprise an ophthalmic lens bearing the refraction area and a clip-on bearing the plurality of contiguous optical elements adapted to be removably attached to the ophthalmic lens when the lens element is worn. Advantageously, when the person is in a far distance environment, outside for example, the person may separate the clip-on from the ophthalmic lens and eventually substitute a second clip-on free of any contiguous optical elements. For example, the second clip-on may comprise a solar tint. The person may also use the ophthalmic lens without any additional clip-on.

The contiguous optical elements may be added to the lens element independently on each surface of the lens element.

At least part, for example all, of the contiguous optical elements may be on a defined array, e.g. an array comprising identical squared shape or hexagonal shaped cell or an array comprising randomly located cells.

Advantageously, the inventors have observed that for a given density of optical element, having at least part of, for example all, the optical elements arranged along a plurality of concentric rings increases the overall acuity of the lens element. For example, having the distance D between two adjacent concentric rings of optical elements greater than 2.00 mm allows managing a larger refraction area between these rings of optical elements and thus provides better visual acuity.

The contiguous optical element may cover specific zones of the lens element, like at the center or any other area of the lens element.

According to an embodiment, the center of the lens element may be free of optical elements. For example, a disk centered on the fitting cross and having a radius greater than 1.5 mm, for example greater than 2 mm, and smaller than 5 mm may be free of contiguous optical elements.

Different parts of the lens element may be free of contiguous optical elements depending on design requirements.

According to an embodiment of the invention, the prescription portion is formed as the portion other than the portions formed as the plurality of optical elements.

According to an embodiment of the invention, the lens element is a contact lens intended to be mounted on wearer eye, and the whole surface of the object face of the lens element is covered with the plurality of contiguous optical elements.

According to a preferred embodiment of the invention, the lens element is an edged lens element intended to be mounted in a spectacle frame and the whole surface of at least one face of the lens element is covered with the plurality of contiguous optical elements.

Figure 2:
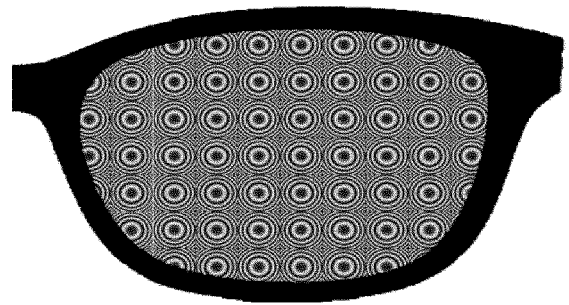
FIG. 2 represents an example of a lens element covered by plurality of contiguous Fresnel type optical elements.

An example of such embodiment is illustrated on FIG. 2, where a face of the lens element is fully covered with a plurality of contiguous Fresnel type optical elements.

Such embodiment allows an easier manufacturing that with optical element discontinuously spread on the surface of the lens element.

The optical power of the second optical function in standard wearing conditions may be smaller than or equal to 0.25 diopters, for example smaller than or equal to 0.1 diopters. According to an embodiment of the invention, the optical power of the second optical function may be equal to 0 diopters.

Therefore, each optical element combined with the prescription portion may provide two optical powers in standard wearing condition. The optical power corresponding to the first and second optical functions provides an optical power close to the prescribed optical power, i.e. with a difference smaller than or equal to 0.25 diopters.

The optical power corresponding to the first and third optical functions provides an optical power focusing light ray other than on the retina of the eye.

The contiguous optical element density or the quantity of power may be adjusted depending on zones of the lens element. Typically, the contiguous optical element may be positioned in the periphery of the lens element, in order to increase the effect of the contiguous optical element on myopia control, so as to compensate peripheral defocus due to the peripheral shape of the retina for example.

According to a preferred embodiment of the invention, every circular zone having a radius comprised between 2 and 4 mm comprising a geometrical center located at a distance of the optical center of the lens element greater or equal to said radius+5 mm, the ratio between the sum of areas of the parts of optical elements located inside said circular zone and the area of said circular zone is comprised between 20% and 70%.

The contiguous optical elements can be made using different technologies like direct surfacing, molding, casting or injection, embossing, filming, or photolithography etc. . .

. . According to the invention photolithography may be particularly advantageous in particular if one of the surfaces of the lens element is plane.

According to an embodiment of the invention, at least one, for example all, of the contiguous optical elements has a shape configured so as to create a caustic in front of the retina of the eye of the person. In other words, such non-contiguous optical element is configured so that every section plane where the light flux is concentrated if any, is located in front of the retina of the eye of the person.

According to the invention the contiguous optical elements have a multifocal refractive optical function.

In the sense of the invention, an optical element is a "multifocal refractive micro-lens" that includes a bifocal face, i.e. with two surface powers, trifocals i.e. with three surface powers, progressive addition face, with continuously varying surface power, for example comprising an aspherical surface.

According to an embodiment of the invention, at least one, for example all, of the contiguous optical elements, is made of a plurality of materials. In particular the refractive index of the optical elements may be different from the refractive index of the material of the lens element.

According to an embodiment of the invention, at least one, for example all, of the contiguous optical elements, is made of a birefringent material. In other words, the optical element is made of a material having a refractive index that depends on the polarization and propagation direction of light. The birefringence may be quantified as the maximum difference between refractive indices exhibited by the material.

According to an embodiment of the invention, at least part, for example all, of the optical elements are diffractive lenses.

For example, at least part, for example all, of the optical elements are pixelated optical elements, such as pixelated lenses, into which one pixel in two is associated to one of each optical function. Examples of pixelated lenses are disclosed in Eyal Ben-Eliezer, Emanuel Marom, Naim Konforti, and Zeev Zalevsky. Experimental realization of an imaging system with an extended depth of field. Appl. Opt., 44(14):2792-2798, May 2005.

According to an embodiment of the invention, at least one, for example all of the contiguous optical elements, has discontinuities, such as a discontinuous surface, for example Fresnel surfaces and/or having a refractive index profile with discontinuities.

Figure 3:
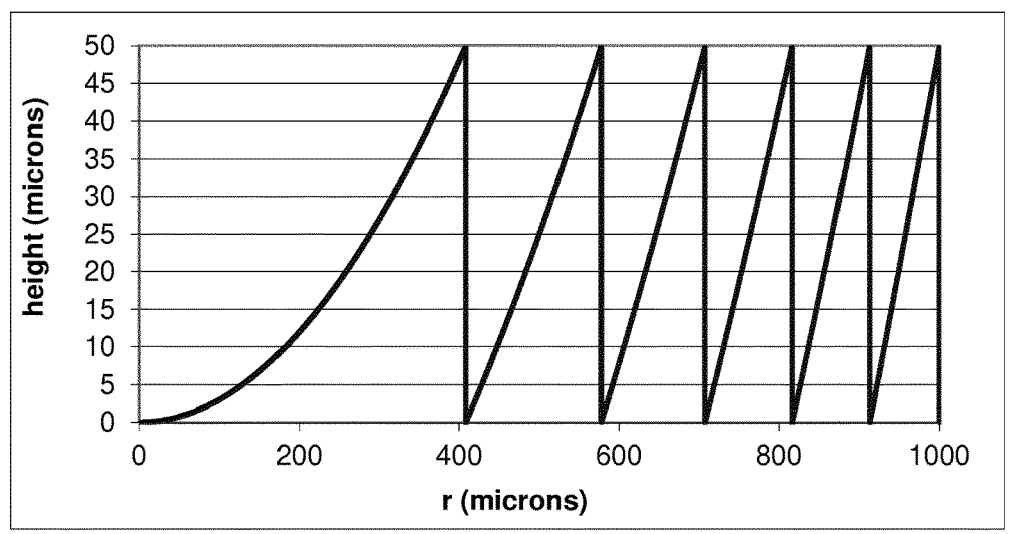
FIG. 3 represents an example of a first diffractive lens radial profile.

FIG. 3 represents an example of a first diffractive lens radial profile of a contiguous optical element that may be used for the invention.

Figure 4:
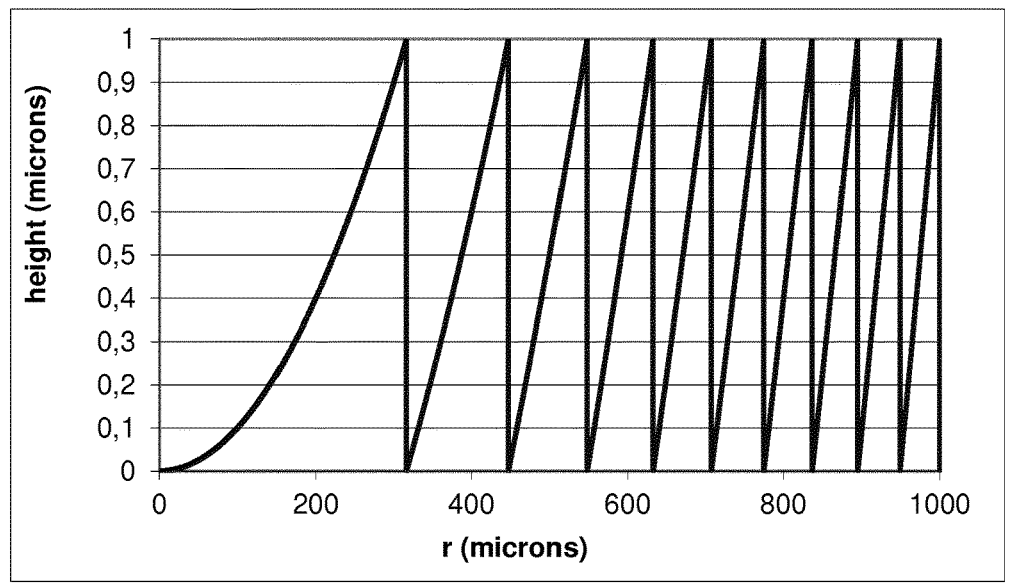
FIG. 4 represents an example of a second diffractive lens radial profile.

FIG. 4 represents an example of a second diffractive lens radial profile of a contiguous optical element that may be used for the invention.

Figure 5:
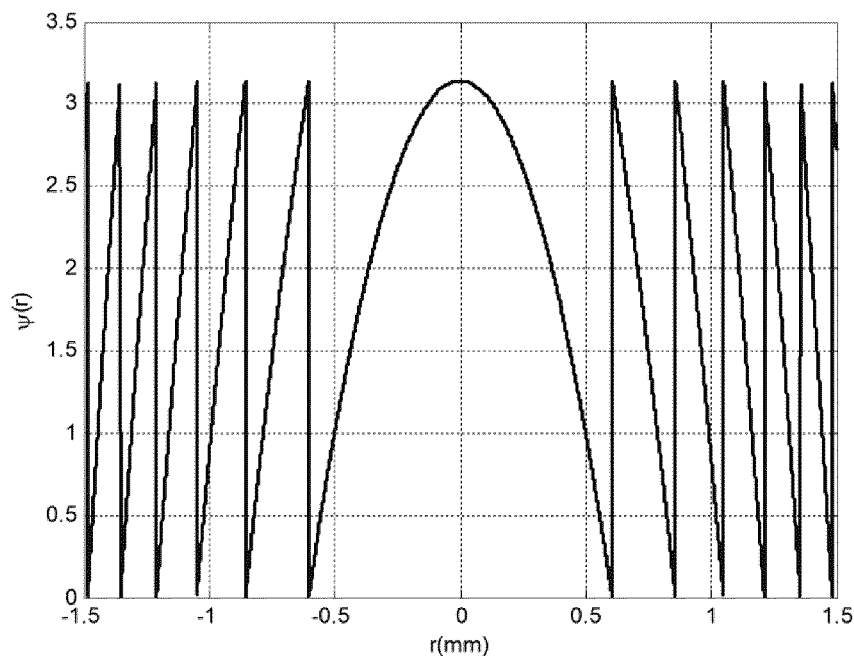
FIG. 5 illustrates a n-Fresnel lens radial profile.

The diffractive lens may be a Fresnel lens whose phase function $\psi(r)$ has $\pi$ phase jumps at the nominal wavelength $\lambda_0$, as seen in FIG. 5. One may give these structures the name "$\pi$-Fresnel lenses" for clarity's sake, as opposition to unifocal Fresnel lenses whose phase jumps are multiple values of $2\pi$. The $\pi$-Fresnel lens whose phase function is displayed in FIG. 5 diffracts light mainly in two diffraction orders (order 0 and +1) associated to dioptric powers $P(\lambda_0)$ =0 $\delta$ and a positive one, for example $P(\lambda_0)$=3 $\delta$, with $\lambda_0$=550 nm.

An advantage of this design is that the diffraction order dedicated to the prescription of the wearer is not chromatic whereas the one used to provide the third optical function to slow down myopia progression is very chromatic.

A typical size for the optical element is greater than or equal to 2 mm and smaller than or equal to 2.5 mm. Indeed, the inventors have observed that maintaining an optical element size smaller than the wearer eye pupil size is advantageous.

For example, the diffraction efficiency of the 0 and +1 orders is of about 40% at the nominal wavelength $\lambda_0$.

Figure 6A:
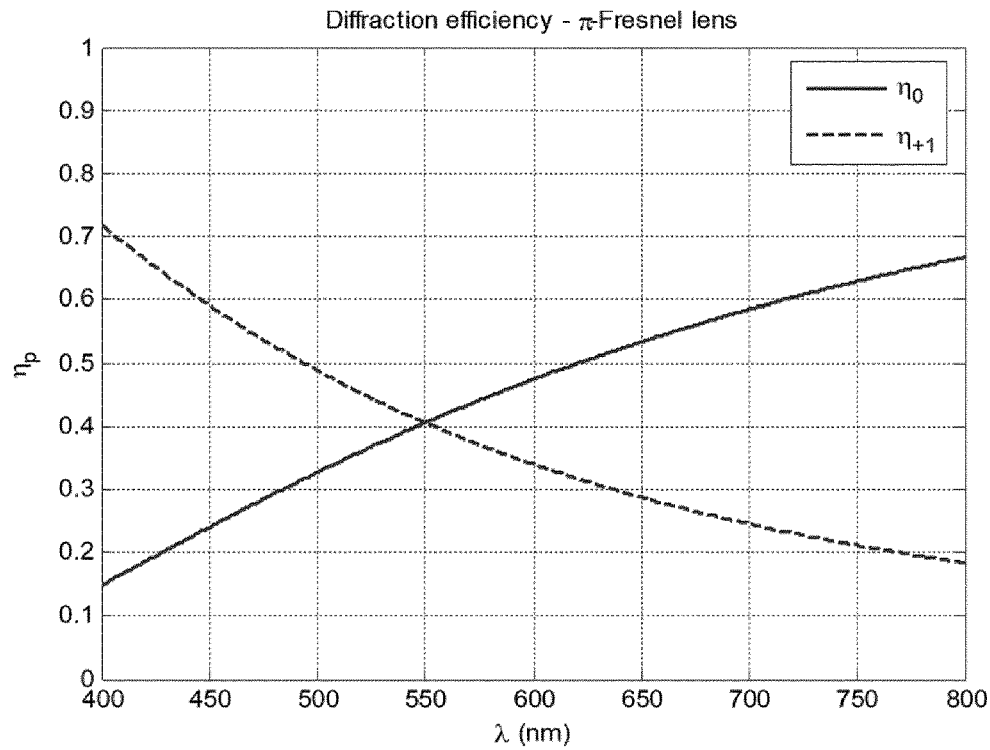
Figure 6B:
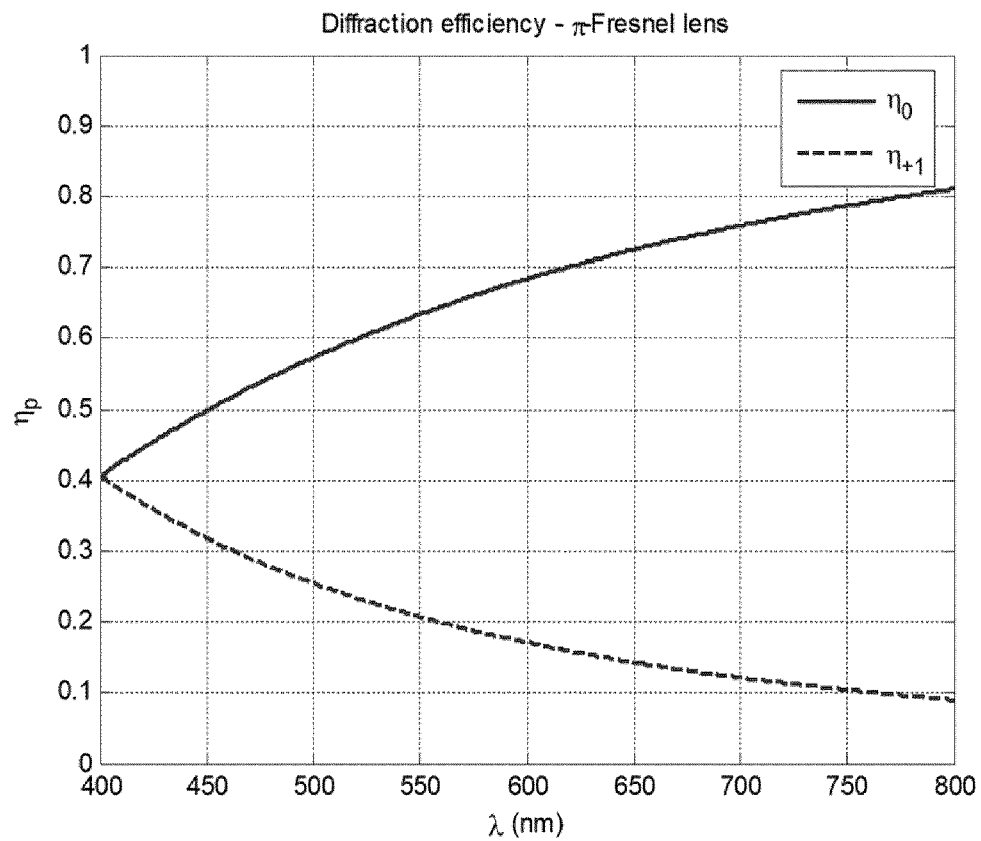

To increase the efficiency of the diffraction order corresponding to the wearer prescription one may consider the following:

To increase the efficiency of the diffraction order 0 one may decrease the value of $\lambda_0$. FIG. 6a shows the diffraction efficiencies with $\lambda_0$=550 nm and FIG. 6b shows the diffraction efficiencies if $\lambda_0$=400 nm. One can notice that in this case, the diffraction efficiency of order 0 is generally higher, whereas the efficiency of order+1 is lower, on the whole visible spectrum. In this case the dioptric power of the refractive phase function to which we apply the phase jumps should be equal to 1.5*400/550≈1.1 $\delta$ for $\lambda_0$=550 nm instead of 1.5 $\delta$ in FIG. 6a. This results in a widening of the rings of FIG. 5.

One may in addition or alternatively set to zero one ring out of two of the configurations illustrated on FIG. 5. In this case, the simultaneously bifocal function still exists due to the remaining Fresnel rings, while the rings set to 0 induce a more important proportion of 0$\delta$ dioptric power.

One may further consider applying Fresnel structures made of two materials with two different refraction indices and different Abbe numbers to obtain the phase function of FIG. 5 at $\lambda=\lambda_0$ and to get more homogeneous efficiencies on the visible spectrum and/or to privilege one of the two main diffraction orders in relation to the other.

Other combinations with superimposed Fresnel structures could be considered.

According to an embodiment of the invention, at least one, for example all of the contiguous optical elements, is a multifocal binary component, for example multifocal binary lenses. The binary lens may have a radial profile with a discontinuity height of about 1 μm.

Figure 7A:
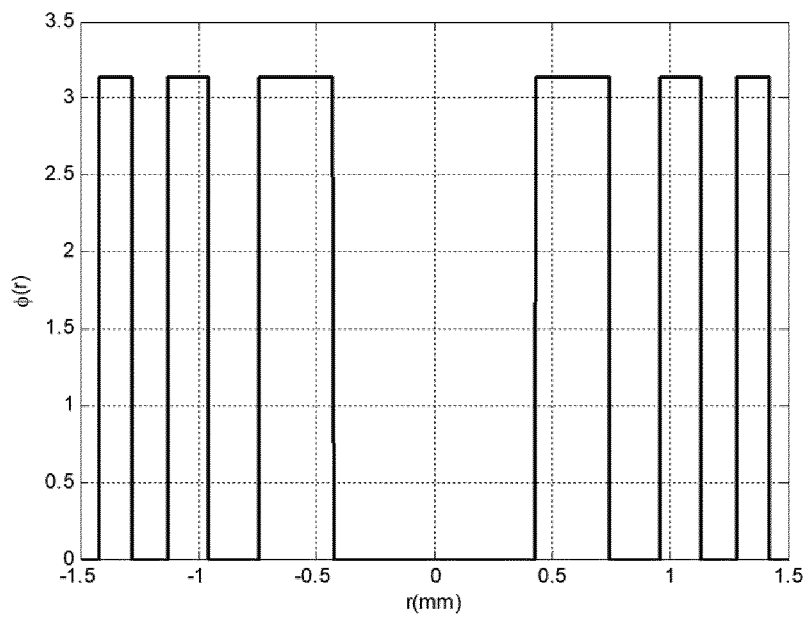
FIGS. 6a and 6b illustrates diffraction efficiencies of a n-Fresnel lens profile as a function of the wavelength and FIGS. 7a to 7c illustrate a binary lens embodiment of the invention.
Figure 7B:
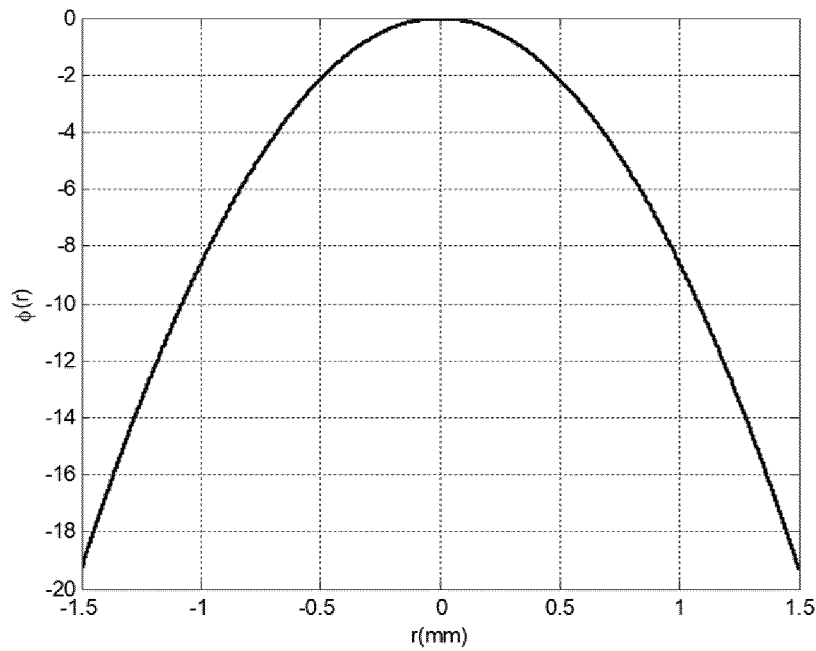
Figure 7C:
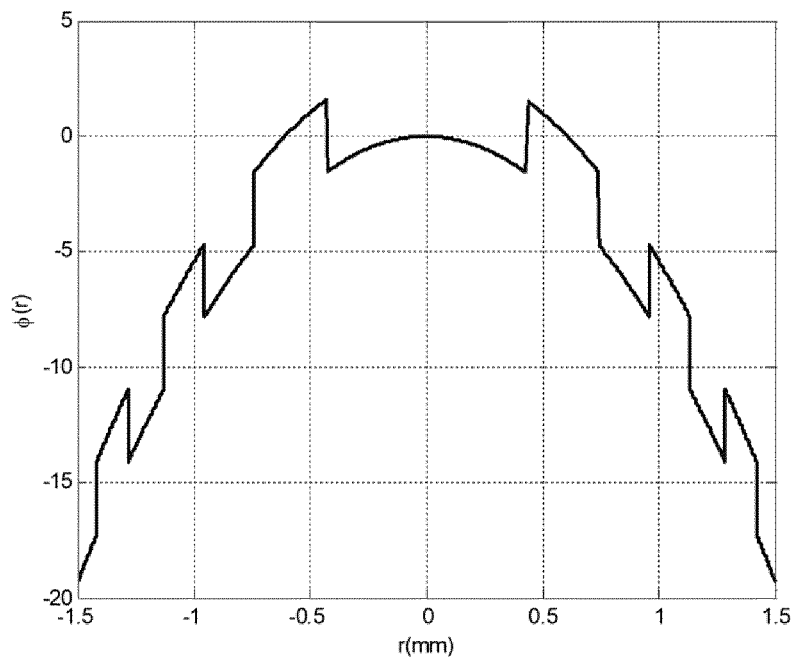

For example, a binary structure, as represented in FIG. 7a, displays mainly two dioptric powers, denoted −P/2 and P/2 and corresponding to two main diffraction orders. When associated to a refractive structure as shown in FIG. 7b, whose dioptric power is P/2, the final structure represented in FIG. 7c has dioptric powers 0 $\delta$ and P. The illustrated case is associated to P=3 $\delta$.

Advantageously the diffraction efficiency of the −1 and 1 orders is of about 40% at the nominal wavelength, in addition the diffraction efficiency stays high all over the visible spectrum, typically over 35%.

According to an embodiment of the invention, at least part, for example all, of the diffractive lenses comprises a metasurface structure also referred to as metalens.

For example, the lens element may comprise an array of simultaneously bifocal metalenses of dioptric power P1, P2 with P1=0$\delta$ and with a controlled chromatism.

Typically, P1=0$\delta$ can be achromatic, meaning having the same focal for each wavelength or partially achromatic.

The chromatism of P2 can be advantageously controlled, for example focal length and efficiency depending on the wavelengths.

The chromatism of each metalens can be different as a function of the position of the metalens on the surface of the lens element, near, intermediate or far vision zone.

Each metalens itself can be made of an array of subwavelength elements:

For example, the sub-wavelength elements can have any shape such as circular, rectangular or elliptical, any dimension, can be equidistant, aligned all in the same direction or in rotation with one another.

The sub-wavelength elements of the metalens should be made of high dielectric material.

Each metalens can be made of a combination of "sub-metalenses". For example, the bifocal properties can be obtained as a function of the wavelength by spatial multiplexing or stack of several sub-metalenses.

The bifocal properties can be obtained as a function of the polarization by spatial multiplexing or stack of several sub-metalenses.

According to an embodiment of the invention, at least one, for example all of the contiguous optical elements, has an optical function with high order optical aberrations. For example, the optical element is a micro-lens composed of continuous surface defined by Zernike polynomials.

The invention has been described above with the aid of embodiments without limitation of the general inventive concept.

Many further modifications and variations will be apparent to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A lens element adapted for a wearer and intended to be worn in front of an eye of said wearer comprising:
   a prescription portion configured to provide to the wearer in standard wearing conditions a first optical function based on the prescription of the wearer for correcting an abnormal refraction of said eye of the wearer, and
   a plurality of contiguous diffractive optical elements,
   wherein each contiguous diffractive optical element has a simultaneously bifocal optical function that provides simultaneously:
      a second optical function in standard wearing conditions, and
      a third optical function of not focusing an image on the retina of the eye in said standard wearing conditions to slow down the progression of the abnormal refraction of the eye.

2. The lens element according to claim 1, wherein an optical power of the second optical function in standard wearing conditions is smaller than or equal to 0.25 diopters.

3. The lens element according to claim 1, wherein the lens element is an edged lens element intended to be mounted in a spectacle frame and the whole surface of at least one face of the lens element is covered with the plurality of contiguous optical elements.

4. The lens element according to claim 1, wherein at least part of the contiguous diffractive optical elements are arranged along a plurality of concentric rings.

5. The lens element according to claim 1, wherein at least part of the contiguous diffractive optical elements are located on the front surface of the lens element.

6. The lens element according to claim 1, wherein at least part of the contiguous diffractive optical elements are made of a birefringent material.

7. The lens element according to claim 1, wherein at least part of the contiguous diffractive optical elements are π-Fresnel lenses.

8. The lens element according to claim 1, wherein at least part of the contiguous diffractive optical elements comprises a metasurface structure.

9. The lens element according to claim 1, wherein at least part of the contiguous diffractive optical elements are multifocal binary components.

10. The lens element according to claim 1, wherein at least part of the contiguous diffractive optical elements are pixelated lenses.

11. The lens element according to claim 1, wherein a difference between an optical power of the second optical function and an optical power of the third optical function is greater than or equal to 0.5D.

12. The lens element according to claim 1, wherein the difference between the optical power of the first optical function and the optical power of the third optical function is greater than or equal to 0.5D.

13. A method for providing a lens element intended to be worn in front of an eye of a wearer including a prescription portion configured to provide to the wearer in standard wearing conditions a first optical function based on the prescription of the wearer for correcting an abnormal refraction of said eye of the wearer, and including a plurality of contiguous diffractive optical elements, wherein each contiguous diffractive optical element has a simultaneously bifocal optical function that provides simultaneously: a second optical function in standard wearing conditions, and a third optical function of not focusing an image on the retina of the eye in said standard wearing conditions so as to slow down the progression of the abnormal refraction of the eye, wherein the method comprises:
   providing the lens element configured to provide to the wearer in standard wearing conditions a first refractive power based on the prescription for the wearer for correcting an abnormal refraction of said eye of the wearer,
   providing an optical patch comprising the plurality of contiguous diffractive optical elements, and
   forming a lens element by placing the optical patch on one of the front or back surface of the lens element,
   wherein each contiguous diffractive optical element has a simultaneously bifocal optical function that provides simultaneously when said patch is placed on one of the surfaces of the lens element:
      a second optical function in standard wearing conditions, and
      a third optical function of not focusing an image on the retina of the eye in said standard wearing conditions to slow down the progression of the abnormal refraction of the eye.

14. A method for providing a lens element intended to be worn in front of an eye of a wearer including a prescription portion configured to provide to the wearer in standard wearing conditions a first optical function based on the prescription of the wearer for correcting an abnormal refraction of said eye of the wearer, and a plurality of contiguous diffractive optical elements, wherein each contiguous diffractive optical element has a simultaneously bifocal optical function that provides simultaneously: a second optical function in standard wearing conditions, and a third optical function of not focusing an image on the retina of the eye in said standard wearing conditions so as to slow down the progression of the abnormal refraction of the eye, wherein the method comprises:
- casting the lens element and during the casting step providing an optical patch comprising the plurality of diffractive contiguous optical elements each contiguous diffractive optical element having a simultaneously bifocal optical function that provides simultaneously when said lens element is worn before said eye of the wearer:
- a second optical function in standard wearing conditions, and
- a third optical function of not focusing an image on the retina of the eye in said standard wearing conditions to slow down the progression of the abnormal refraction of the eye.

* * * * *